(12) United States Patent
Pratt et al.

(10) Patent No.: US 6,552,590 B2
(45) Date of Patent: Apr. 22, 2003

(54) CLOCKING SCHEME FOR ASIC

(75) Inventors: Susan M Pratt, Limerick (IE); Vincent Gavin, Galway (IE); Tadhg Creedon, Furbo (IE); Suzanne M Hughes, Barna (IE); Mike Lardner, Tuam (IE); Padraic O'Reilly, Corofin (IE)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/879,065

(22) Filed: Jun. 13, 2001

(65) Prior Publication Data

US 2002/0140457 A1 Oct. 3, 2002

(30) Foreign Application Priority Data

Feb. 27, 2001 (GB) .............................. 0104828

(51) Int. Cl.⁷ ................................. H03K 3/00
(52) U.S. Cl. ..................... 327/295; 327/144; 327/145
(58) Field of Search .............................. 327/141, 144, 327/145, 295, 297, 291; 375/354, 356; 713/400, 501

(56) References Cited

U.S. PATENT DOCUMENTS

| | | | | |
|---|---|---|---|---|
| 4,700,350 A | * | 10/1987 | Douglas et al. | 327/144 |
| 5,150,364 A | * | 9/1992 | Negus | 327/295 |
| 5,987,083 A | * | 11/1999 | Matsushita et al. | 375/356 |
| 5,999,023 A | * | 12/1999 | Kim | 327/144 |
| 6,040,723 A | * | 3/2000 | Sato | 327/141 |

* cited by examiner

Primary Examiner—Tuan T. Lam
(74) Attorney, Agent, or Firm—Nixon & Vanderhye P.C.

(57) ABSTRACT

A clock scheme for a system on a chip wherein integral sub-multiples of a system clock have positive edges on odd-numbered positive edges of the system clock and negative edges on even-numbered positive edges Data transfer between blocks of different frequencies is controlled by a state machine of the higher frequency block and can be achieved without elastic buffers and/or synchronizers.

15 Claims, 17 Drawing Sheets

| Present State | Next State | O/P (CLK3 Sample8 Strobe8) | | |
|---|---|---|---|---|
| 00000 | 00001 | 0 | 1 | 0 |
| 00001 | 00010 | 1 | 1 | 0 |
| 00010 | 00011 | 0 | 0 | 0 |
| 00011 | 00100 | 1 | 0 | 0 |
| 00100 | 00101 | 0 | 0 | 1 |
| 00101 | 00110 | 0 | 0 | 1 |
| 00110 | 00111 | 0 | 0 | 1 |
| 00111 | 01000 | 1 | 0 | 0 |
| 01000 | 01001 | 0 | 1 | 0 |
| 01001 | 01010 | 1 | 1 | 0 |
| 01010 | 01011 | 0 | 0 | 0 |
| 01011 | 01100 | 0 | 0 | 0 |
| 01100 | 01101 | 0 | 0 | 1 |
| 01101 | 01110 | 1 | 0 | 0 |
| 01110 | 01111 | 0 | 0 | 0 |
| 01111 | 10000 | 1 | 0 | 0 |
| 10000 | 10001 | 0 | 0 | 0 |
| 10001 | 10010 | 0 | 0 | 0 |
| 10010 | 10011 | 0 | 1 | 0 |
| 10011 | 10100 | 1 | 1 | 0 |
| 10100 | 10101 | 0 | 0 | 1 |
| 10101 | 10110 | 1 | 0 | 0 |
| 10110 | 10111 | 0 | 0 | 0 |
| 10111 | 00000 | 0 | 0 | 0 |

FIG. 8

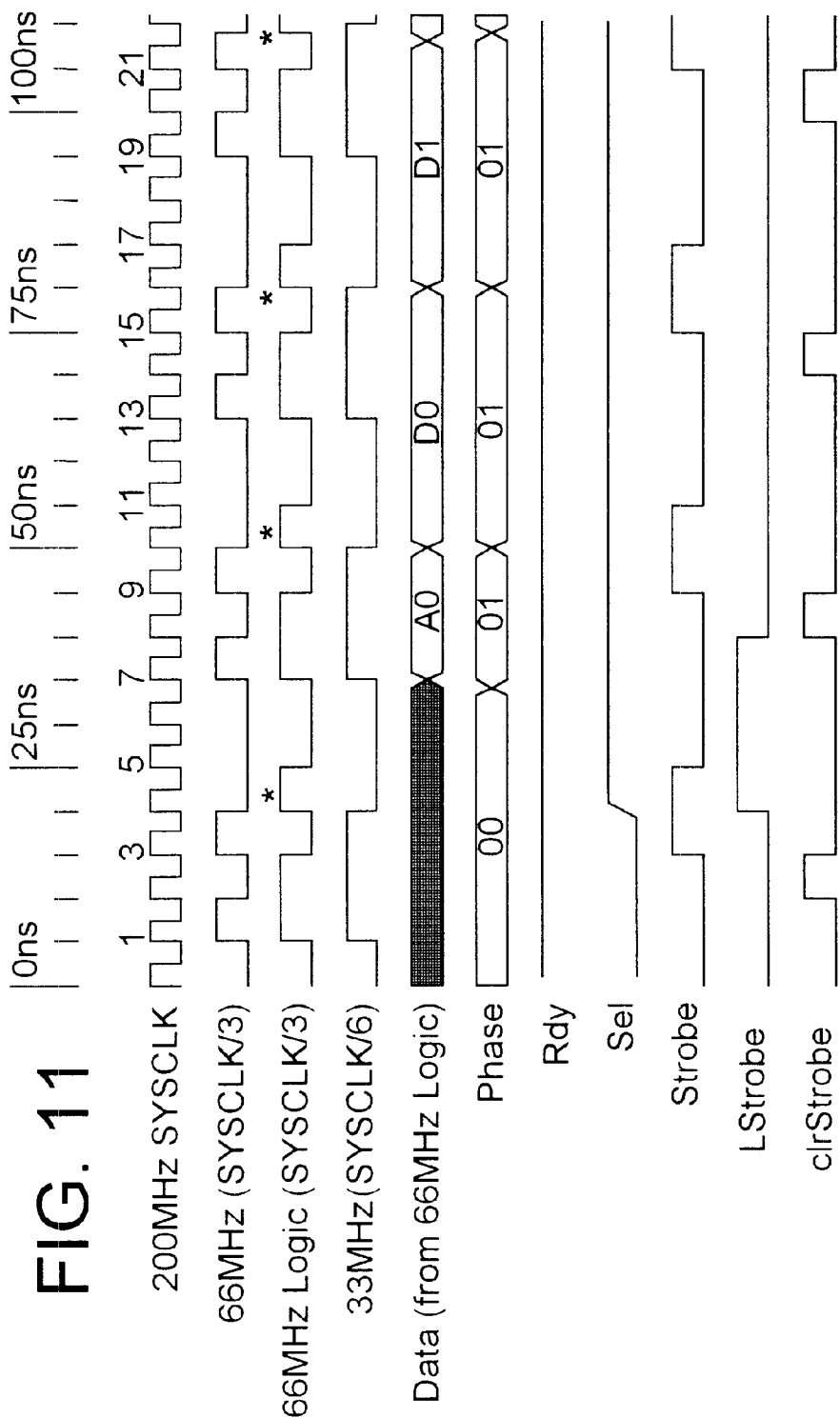

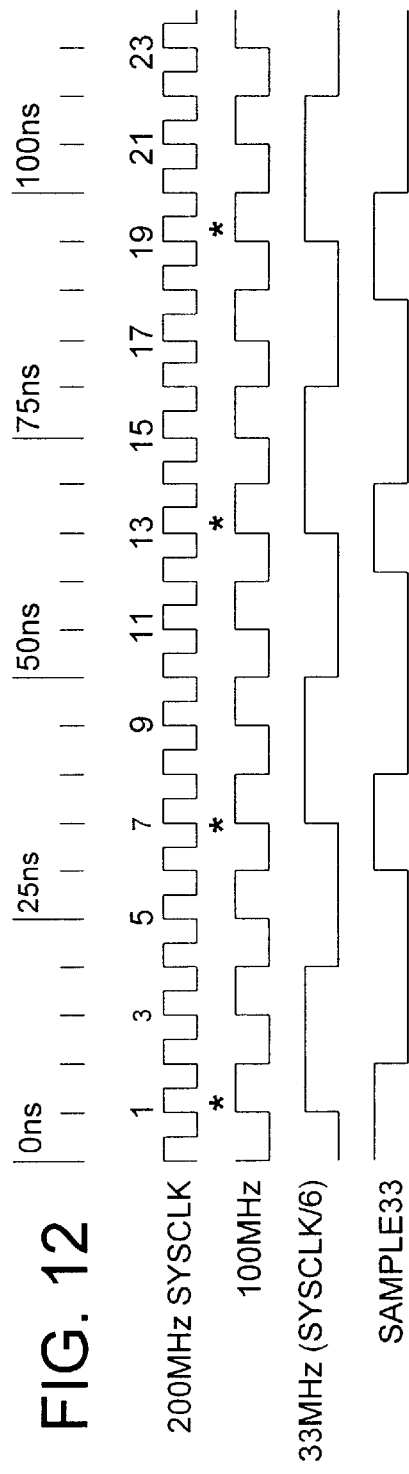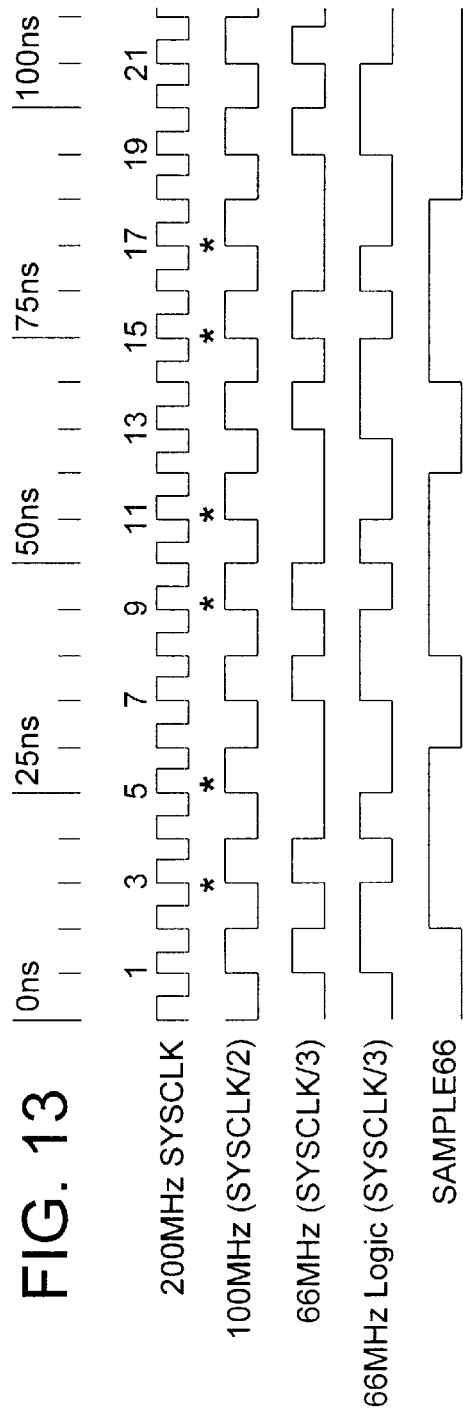

CLOCKING SCHEME FOR ASIC

FIELD OF THE INVENTION

The present invention relates to application specific integrated circuits and more particularly to such circuits which require a substantial variety of clock signals at different, though related. frequencies for the operation of a multiplicity of operational blocks within the application specific integrated circuit.

BACKGROUND OF THE INVENTION

In current technology there is a marked trend towards providing an entire operating system. for example a network switch. on a single large chip supporting an application specific integrated circuit Certain features. such as keypads and terminal connectors for physical lines and large scale memories are necessarily practical exceptions.

A 'system on a chip' architecture customarily envisages a large number of disparate operational blocks at least some of which are predefined before design and lay-out of the integrated circuit Whether or not such blocks are taken from a 'library' in a practical large scale system a considerable variety of clock signals is necessary.

Although individual clock signals can be generated by high precision crystal controlled generators. minor discrepancies between nominal and actual clock frequencies can occur It is generally desirable to provide a single highly stable system clock and to provide division of that system clock to obtain the individual clock frequencies for the variety of different operational blocks within the device.

Most clocking schemes in ASICs require 'elastic' buffers which can cope with minor variations between clock frequencies and synchronisers to ensure smooth data transfer within the ASIC Existing schemes also require a system clock to be used by most components on the ASIC.

Routing for a system-wide system clock has in practice proved to be very difficult making timing errors a common occurrence Elastic buffers and synchronisers occupy substantial space on a silicon chip.

SUMMARY OF THE INVENTION

The invention aims to provide a clocking scheme which eliminates the need for elastic buffers and synchronisers between devices, and to reduce the need for the system clock, as such, to be used by more than a few blocks within the ASIC. so as to reduce the load on the system clock.

The present invention concerns an integrated circuit which includes a clock system wherein various clock signals (called herein simply 'clocks'). consisting of transitions (edges) between binary values are derived from a system clock More particularly the clock system is characterised by rules which are based on the numbering of similar transitions (arbitrarily termed herein 'positive edges') of the system clock to distinguish between 'even' numbered positive edges and 'odd' positive edges and which prescribe the edges of the derived signals obtained by dividing the system clock Various special rules are necessary for certain types of clock to enforce the general rules.

In a preferred embodiment of the invention a high frequency system clock is provided for the ASIC. individual blocks within the ASIC dividing the system clock to generate their own clock signal The system clock can be divided by any integer to achieve an integral sub-multiple clock frequency If a block communicates with only one block at the next level of hierarchy above it, then that sub-block may generate its clock from the clock of the block above it in the hierarchy This ensures that the system clock has minimum loading and is used only to generate a clock signal for a small number of blocks.

To ensure correct data transfer without the use of synchronising circuits, alternate transitions (positive edges) of the system clock are 'numbered' All denied clocks must have their positive edges coincident with an odd numbered positive edge of the system clock, and must have their negative edges coincident with an even numbered. positive edge of the system clock Any functional block of the ASIC can (subject to the operation of a respective state machine) clock out data on the positive edge of its own clock and receive data on its negative edge Because of these rules, data cannot be clocked out of one block and into another on the same clock edge and therefore data transfer without the danger of loss can occur. without the need for 'elastic' buffers and/or synchronisers.

Dividing a system clock by an integer may require a clock that alternates between two frequencies, one slower and one faster than the intended frequency A special 'logic' clock must be generated if the logic within a block is unable to run at the higher frequency Such a special clock would not obey the rules set out above and so a retiming needs to be performed at the output of the relevant block.

There is no handshaking required between blocks in different clock domains Each block will be aware of the numbering scheme and is therefore aware when other blocks can send or receive data.

Further features of the invention will be apparent from the following detailed description with reference to the accompanying drawings.

BRIEF DESCRIPTION OF THE DRAWINGS

FIG. 8 illustrates a state machine.

FIGS. 10 to 13 are further timing diagrams illustrating the derivation of clocks.

DESCRIPTION OF A PREFERRED EMBODIMENT

Figure 1:
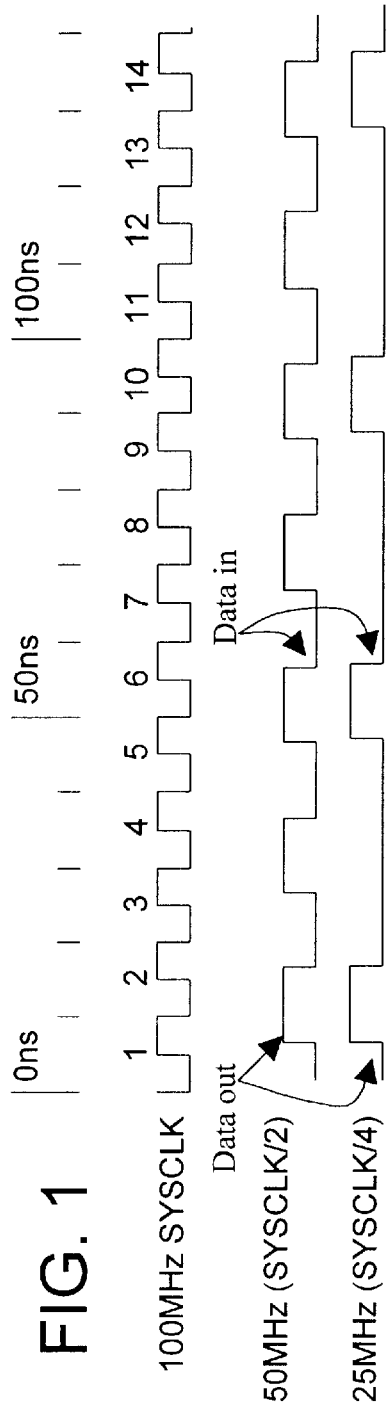
FIG. 1 to FIG. 6 are timing diagrams illustrating the manner in which various clocks are derived from a system clock.

As noted earlier, the invention concerns integrated circuits having a multlliplicity of operational blocks and particularly a 'system on a chip' A complete circuit will not be described because the particular operations performed by it are not important the invention concerns the provision of clocks for data transfer or for logic within blocks, and the control of data transfer between blocks One simplified example is described later with reference to FIG. 23.

In the following description various abbreviations are employed for convenience, as follows CLK means a clock (i.e a clock signal specified by transitions between binary values)

SYSCLK means a system clock provided for division to lower frequencies

Parent CLK means a CLK (which may or may not be SYSCLK) used for division to lower frequencies There may be multiple parent CLKs on a chip, i.e. each time a particular CLK is used to derive a new frequency. that original CLK can now be classified as a parent CLK Even CLK means a clock that is derived from SYSCLK or a Parent CLK by dividing the SYSCLK or Parent CLK by an even number Odd CLK means a clock that is derived from SYSCLK or a Parent CLK by dividing the SYSCLK or Parent CLK by an odd number Interface (I/F)CLKs refer to clocks that are used to clock data into and out from a block Logic CLK is a clock that may be used to clock internal logic within a block. and may also be used to clock the output POSEDGE refers to a positive or rising clock transition NEGEDGE refers to a negative or falling clock transition M-S Ratio means a Mark-Space Ratio The desiginations 'positive' and 'rising' and their counterparts are arbitary. Depending on the technological implementation. positive and rising man refer to an electrically positive transition or an electrically negative transition.

Objectives of Clocking Scheme

The general objectives of the clocking system are (i) to ensure safe data transfer through the hierarchy of functional blocks constituting a chip without introducing synchronisers between blocks operating at different frequencies, and (ii) to achieve this using preferably the lowest possible frequency clocks around the chip thereby minimising the power consumption of the chip.

Rules for Clocking System

A clocking scheme according to the invention is intended to follow the rules indicated below In a practical system not all the rules need apply and are presented in decreasing order of importance.

SYSCLK can be divided down to achieve lower CLK frequencies to be used around the chip, thus significantly reducing overall system power A preferred optimisation is to provide that, if a node. X. communicates with only one higher level node. Y, X's CLK can be derived from Y's CLK. rather than the SYSCLK (Y is now the Parent CLK of X.) The other benefit is that, the slower a logic block can afford to be while still performing its intended function the easier the physical layout issues (timing, routing) will be to deal with.

All subsequent I/F CLKs derived from SYSCLK have POSEDGEs on odd numbers of the SYSCLK edges, and have NEGEDGEs on even numbers of the fast SYSCLK edges Data is clocked Out on a POSEDGE of an I/F CLK. and is clocked in on a NEGEDGE of an I/F CLK This guarantees data transfer between clocks of different frequency.

FIG. 1 illustrates a 100 MHz SYSCLK hating its rising edges notionally numbered (1, 2 etc) A 50 MHz clock is obtained by dividing the SYSCLK by two The POSEDGEs of the 50 MHz clock (SYSCLK/2) correspond to odd-numbered positive edges of the SYSCLK whereas the NEGEDGEs of SYSCLK/2 correspond to even-numbered positive edges of the SYSCLK When SYSCLK/2 is employed for clocking data into and out of memory data will be clocked in on the negative edges and clocked out on the positive edges.

FIG. 1 also illustrates a 25 MHz clock ('SYSCLK/4') conforming to the same rules The M-S ratio necessarily alters to comply with the rules.

For data transfers between two blocks. one of which is running at the SYSCLK frequency. data is clocked into the block running at SYSCLK on an even-numbered SYSCLK POSEDGE. and data is clocked out from that on an odd-numbered SYSCLK POSEDGE.

Figure 2:
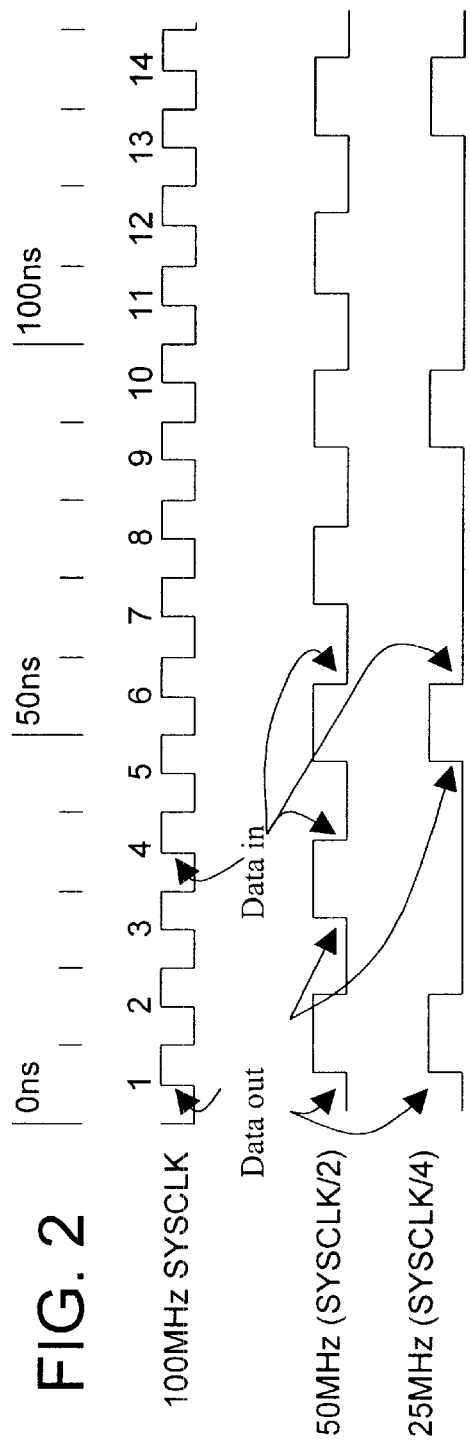

This is exemplified in FIG. 2. which resembles FIG. 1 but shows in addition data transfers controlled by the 100 MHz SYSCLK.

Logic CLKs are a special kind of CLK and are discussed below.

Interface CLKS

All POSEDGEs of an interface clock should be on an odd-numbered fast system clock. SYSCLK and all NEGEDGEs are on an even-numbered fast system clock SYSCLK From a start the rising edge of SYSCLK will be 'odd' and ever I/F CLK should have its first rising edge at this time Odd I/F CLKs achieve POSEDGE/NEGEDGE rule by jumping between the two nearest even frequencies Thus odd CLKs are "periodic", or repeatable, every two periods Odd CLKs need an extra logic CLK if logic cannot be clocked at the faster of its two component frequencies.

Figure 3:
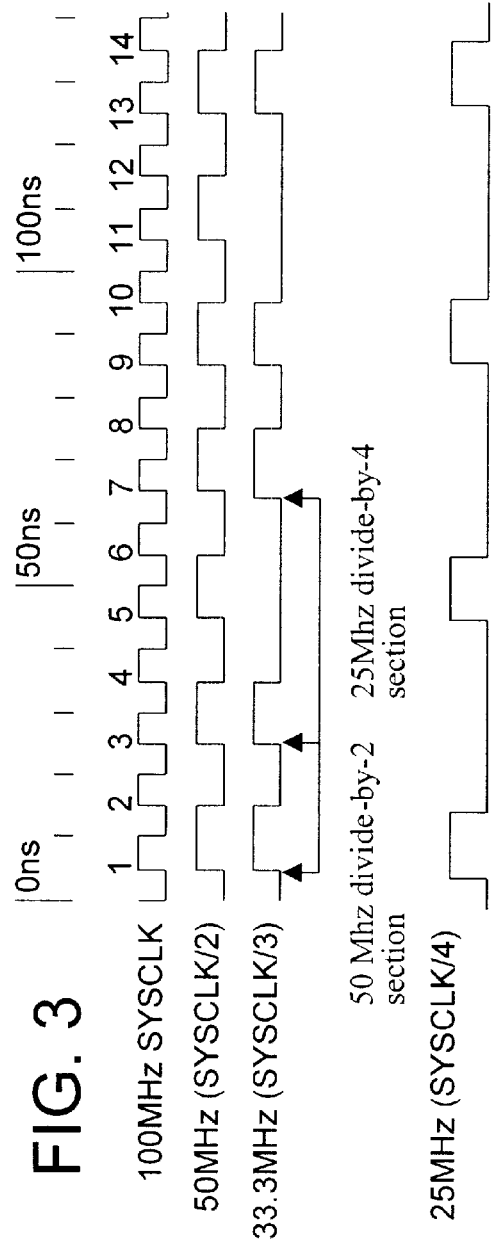

This is illustrated in FIG. 3 which in addition to SYSCLK SYSCLK/2 and SYSCLK/4 (as shown in FIG. 2) shows an odd I/F CLK namely SYSCLK/3 composed of alternating cycles at 50 MHz and 25 MHz (SYSCLK/2 and SYSCLK/4).

Logic CLKs

Logic CLKs differ from I/F CLKs in that (a) data is clocked in on a POSEDGE and clocked out on a NEGEDGE (ie a state machine runs on the Logic CLK's POSEDGE. but retimes data to NEGEDGE@ clock-out) (b) POSEDGEs are evenly spaced to maintain the desired frequency NEGEDGEs correspond to odd POSEDGEs of the system or parent clock to obey the POSEDGE rule This ensures safe data transfer by clocking out using the NEGEDGE of the Logic CLK.

Figure 4:
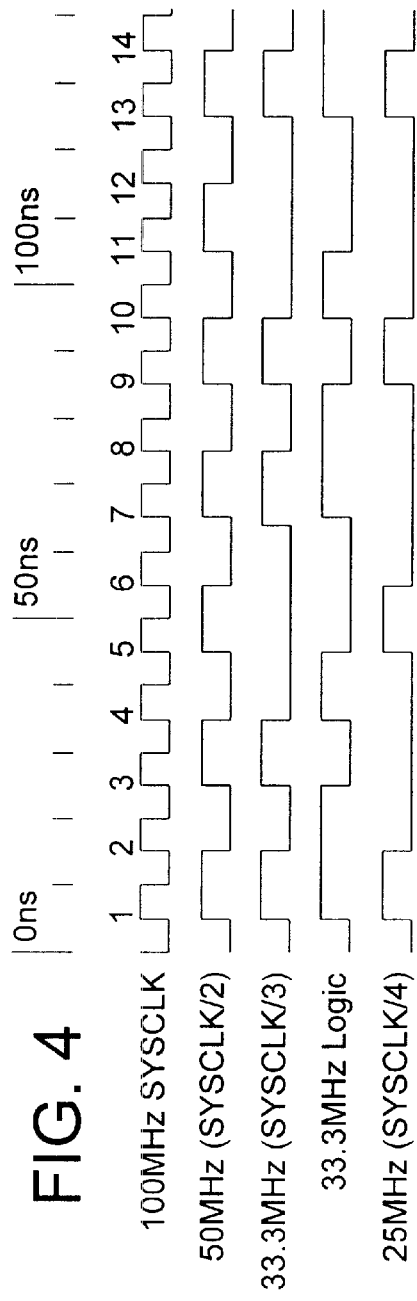

FIG. 4 illustrates a 100 MHz system clock (SYSCLK) divided down to SYSCLK/2 SYSCLK/3 and SYSCLK/4 as in FIG. 3 and also a 33.3 MHz Logic Clock It may be noticed that the positive edges of this clock are evenly spaced. unlike those of SYSCLK/3 which is at the same mean frequency.

Mark Space Ratios

A divide-by-n CLK will be high for 50% of the faster CLKs states if n/2 is an odd number For CLKs with an uneven M-S ratio. NEGEDGEs may be chosen to maintain an M-S ratio of as close to 50% of the states as possible while still falling on an even numbered SYSCLK/parent CLK edge As noted in relation to interface clocks. odd CLKs derive their M-S ratio by obeying the M-S ratio for the its two component even frequencies.

It is important to note that two CLKs of the same frequency, but densed from different frequency parent CLKs. can have different M-S ratios As shown in FIG. 4 the M-S ratio of the logic signal at 33.3 MHz is 50% whereas the MS ratio of SYSCLK/3 is 33%.

Using Derived CLKs as Parent CLKs

A derived CLK can be used as a parent CLK if its 'children' do not communicate directly to any other block at a higher level. and if all CLKs below this 'child' block can be derived from the child block For this feature. SYSCLK should be masked from the child block. and the POSEDGEs of the parent block need notional renumbering in the same manner as the SYSCLK numbering system Therefore, the child block sees the parent block's numbering scheme. and obeys the clocking scheme rules relative to this numbering system.

Figure 5:
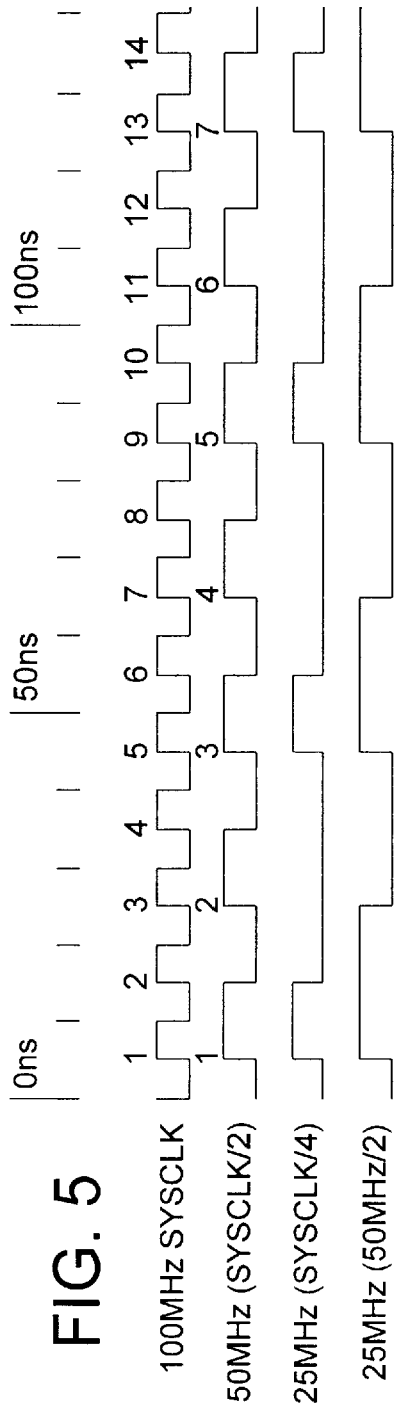

FIG. 5 shows a 50 MHz CLK being used as a parent CLK for a 25 MHz block Note the new numbering being added to the POSEDGEs of the 50 MHz CLK in order to mask the SYSCLK from the 25 MHz block SYSCLK/4 is derived directly from SYSCLK but the clock 25 MHz (50 MHz/2) is derived from SYSCLK/2 and its edges follow the basic rules in relation to SYSCLK/2. not SYSCLK.

Figure 6:
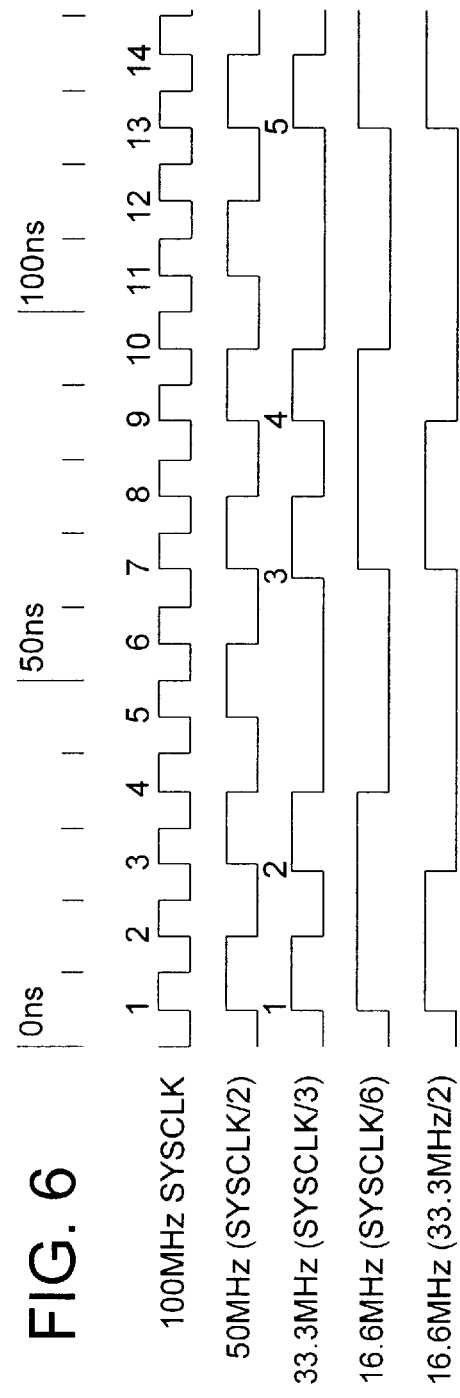

FIG. 6 shows a 33.3 MHz CLK being used as a parent CLK for an 16.6 MHz CLK Note that, although the M-S ratio looks less than 50%. it actually, is a 50% M-S ratio relative to the new numbering system employed on the POSEDGEs of the 33 MHz CLK.

CLK Generation Block State Machines & Periodicity

Since all the clocks can be regarded as starting with a rising edge. it is feasible (as in known systems) to initialise all the blocks to the same phase using a cascading SYNC signal which re-syncs CLKs periodically This cascading SYNC signal is a signal that is passed from one clock generation block to another sequentially on the chip. and insures that all clocks are in a predetermined phase when this signal reaches then If a clock is in an incorrect phase on receipt of the sync signal. an ERR flag is set. and the clock generation circuit should ensure that the clock is returned to the correct phase This is described in more detail later in the document.

As explained previously Even CLKs require n states for periodicity. odd CLKs require (n*2) states for periodicity The number of states in each state-machine is a direct result of the LCM (Lowest Common Multiple) of the 'divide-by numbers' of the two blocks which transfer data to each other As will be described with reference to FIG. 8. when (for example) a divide-by-3 block is coupled to a divide-by-8 block a state machine of twenty-four states running at the SYSCLK frequency, is required for control It is important to note here that for an data transfer involving an 'even' divide-by number. the LCM itself equates to the actual number of states required However if no even CLK is involved in the data transfer. then the number of states is actually the LCM*2.

State Machine Design and Data Transfer

Each block that transmits data to. or receives data from. a lower block must be associated with a state machine This state machine depends on four factors. the speed of parent CLK the Parent CLK of lower blocks. the speed of lower blocks and the possible presence of Logic CLKs.

Unlike many schemes that transfer data between blocks of different frequencies. there is no requirement to send a clock on the bus This is because the CLK generation block for the faster block can be programmed with the required slower block value It knows. therefore the number of (parent CLK) states required for the two blocks to share periodicity. and also the location on the numbering scheme of the slots CLKs POSEDGEs and NEGEDGEs Based on this knowledge. it can be programmed to output control signals to the faster block which control on which edges to Strobe (clock out) data. and on which edges to Sample (clock in) data. This means that the higher block contains all necessary intelligence to transfer data safely between the two blocks.

Figure 7:
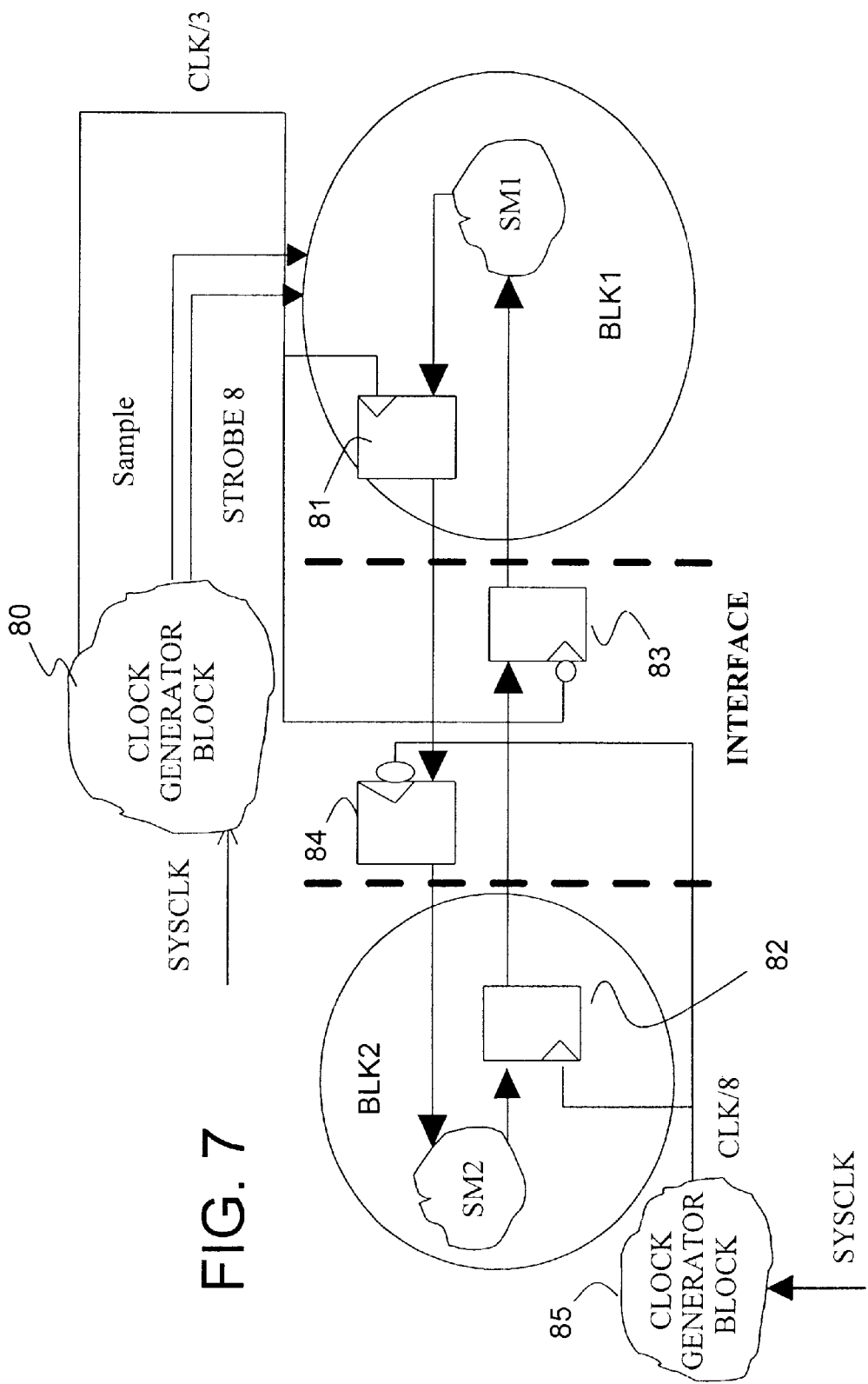
FIG. 7 is a schematic diagram illustrating part of an integrated circuit using in accordance with the invention.

FIG. 7 will be used to discuss data transfer between to blocks which both have clocks derived from SYSCLK and in particular which have clocks SYSCLK/3 and SYSCLK/8 respectively The LCM of 3 and 8 is 24 so the state machine needs 24 states.

A clock generator block 80 receives the system clock SYSCLK. divides by 3 to produce SYSCLK/3 and provides that clock to BLK1, BLK1 includes a state machine SM1 The clock generator block generates a Strobe8 signal This signal is used to identify a safe POSEDGE of the CLK3 clock to write/transmit data. Data is clocked into a block denoted BLK2 on NEGEDGE of CLK8 BLK2 has a state machine SM2 which runs on POSEDGE of CLK8 Data is clocked out from BLK2 on POSEDGE of CLK8.

Bistable latches 81 to 84 are the clocked latches for data input and output from the operational blocks Each represents a set of parallel latches all controlled by the respective clock if data is in parallel form latches 81 and 82 control the output of data from BLK1 and BLK2 respectively and latches 83 and 84 control the input of data to the blocks BLK1 and BLK2 respectively.

Data is accepted into BLK1 by way of latch 83 on NEGEDGE of CLK3. and sampled on the POSEDGE here Sample8 is high The clock generator block only generates the CLK for the faster block. but it still must know the speed of the slower block in order to function correctly In layout terms, it will be disposed adjacent block BLK1 The slower block BLK2 should have its own clock generator block 85 which is located beside it.

Data Transfer Between Divide-by-3 (Including Logic CLK) and Divide-by-8

Figure 9:
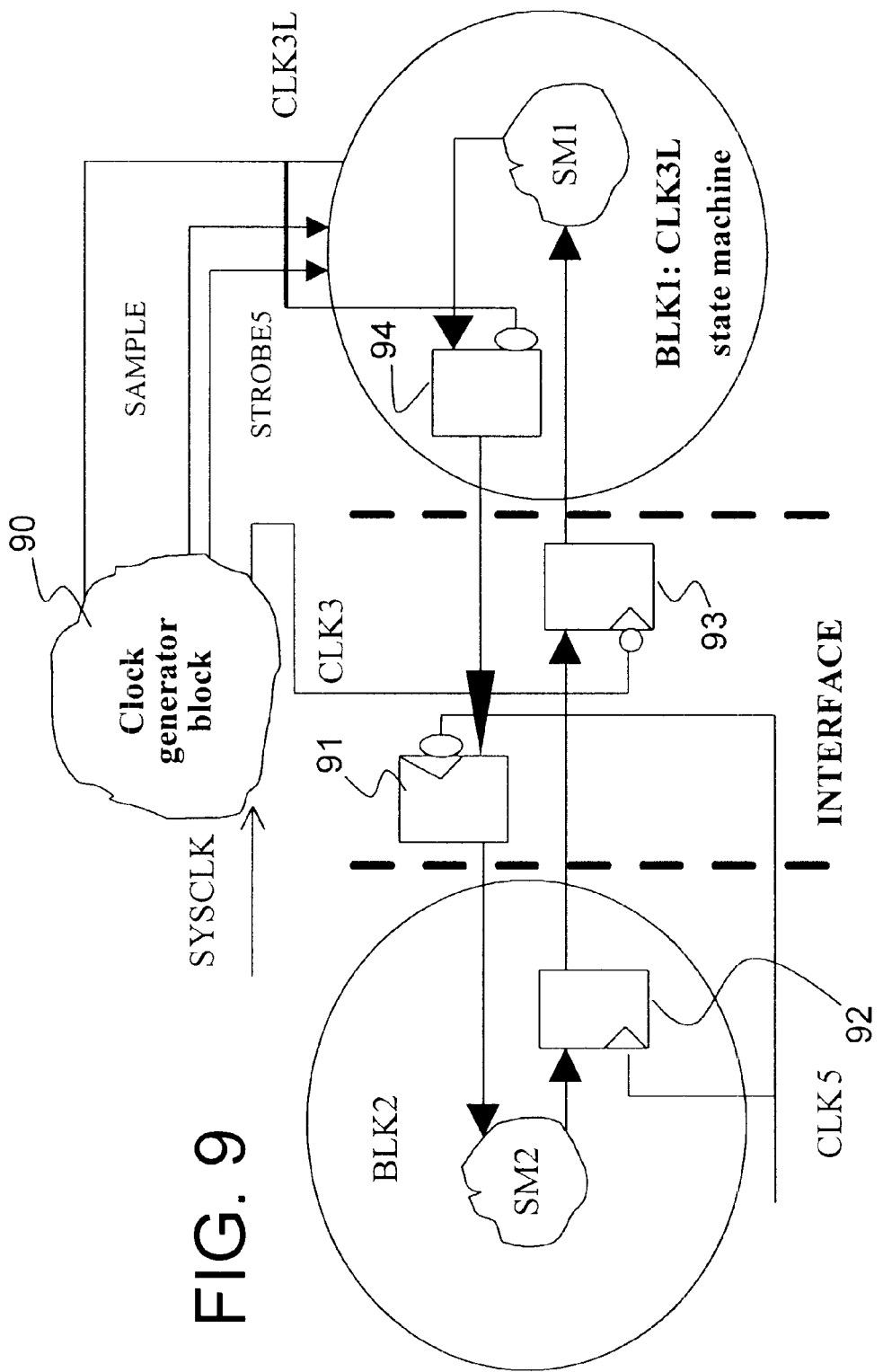
FIG. 9 is another schematic diagram illustrating part of an integrated circuit using clocks according to the invention.

FIG. 9 illustrates data transfers between a block (BLK1) which utilises a Logic Clock. specifically CLK3L at one third the frequency of the system clock SYSCLK and another block (BLK2) which utilises an I/F clock CLKS. which is at one fifth the frequency of the SYSCLK The state machine SM1 in BLK1 has 30 states (5*3*2). as no even CLK is involved in the transfer of data The SYSCLK is taken down to the clock generator block 90. which generates the Divide-by-3 and Divide-by-3L CLKs and passes them to BLK1 The clock generator block1 also generates a Strobe5 signal This signal is used to identify a safe POSEDGE of the CLK3 clock to write/transmit data This data is then re-timed to the NEGEDGE of the CLK3L clock by latch 94 Data is clocked into BLK2 by way of latch 91 on NEGEDGE of CLK5 These features follow the rules for I/F clocks and Logic clocks BLK2's state machine runs on POSEDGE of CLK5 Data is clocked out from BLK2 by a of latch 92 on POSEDGE of CLK5 Data is accepted into BLK1 via latch 93 on NEGEDGE of CLK3 and sampled on the POSEDGE of CLK3L where Sample5 is high The clock generator block only generates the CLK for the faster block but it still must know the speed of the slower block in order to function correctly In layout terms, it will be disposed adjacent the faster block The slower block should have its own clock generator block which is located adjacent to it.

Rules for Generating Sample/Strobe Signals

Figure 10:
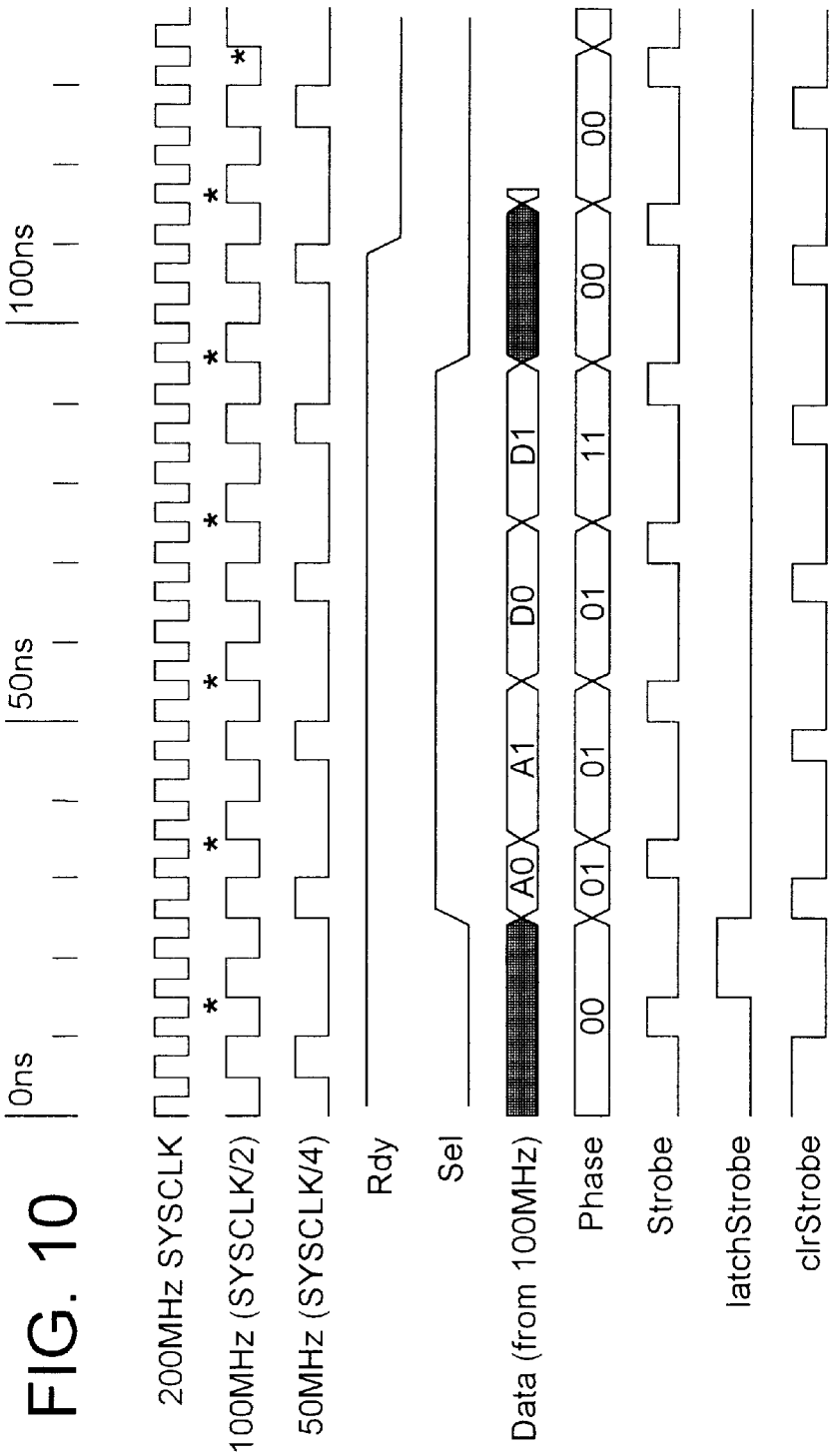

When data is to be transferred from a fast block to a slows block where both blocks employ interface clocks. only certain POSEDGES of the fast CLK are valid edges on which to transfer data Therefore a strobe signal should be generated by the clock generator state machine. the strobe signal man be asserted on every NEGEDGE of the slower CLK This strobe signal stays 'high' long enough to be seen by the first POSEDGE of the fast CLK after this slow CLK NEGEDGE However, if the faster block does not avail of its strobing point, it can latch this strobe value and use it at a later stage The latched value may be cleared by a signal 'clrStrobe' which is a signal to ensure that the block does not attempt to transmit data across the bus interface in a SYSCLK period It asserts just before strobe and overrides latchStrobe This arrangement allows the faster block to use any edge between a strobe and 'clrStrobe' if the strobe was not utilised initially This can be seen in FIG. 10 Data is to be transferred from the 100 MHz clock domain to the 20 MHz domain The asterixes in FIG. 10 represent the edges that clock the Strobe pulse The edge corresponding to the first asterix does not clock data here because a selected signal (Sel) is 'low' Because of this. the latch strobe signal is set. and this causes the data to be clocked out at the next 100 MHz POSEDGE.

These rules will be different for data from a block employing a fast Logic CLK to a slower block employing an interface clock Now the valid edges correspond to the POSEDGE (fast Logic CLK) before first NEGEDGE (fast Logic CLK) after NEGEDGE (slow I/F CLK) This rule is shown in FIG. 11 wherein the asterixes denote the edges that clock the Strobe pulse The edge corresponding to the first asterix does not clock data here. because the Sel signal is low Because of this, the LStrobe signal is set. and this causes the data to be clocked at the next 66.6 MHz Logic POSEDGE (and re-timed on its NEGEDGE).

Valid Edges for Slow to Fast Data Transfer

When data IS transferred from a slow block to a fast block and both blocks employ interface clocks. only certain POSEDGEs of the faster CLK are valid edges on which to sample the data transmitted by the slow block These edges occur on the POSEDGE (fast CLK) before first NEGEDGE (fast CLK) after POSEDGE (slow CLK).

Therefore, a sample signal can be generated indicating on which POSEDGEs to sample data This sample signal should assert on the SYSCLK edge before the valid edge. and de-assert on the SYSCLK edge after the valid edge (if the next SYSCLK edge is not a valid sampling edge) The valid edges in these circumstances are asterisked in FIG. 12.

The above rule has to be altered when transferring data from a slow Logic CLK to a fast I/F CLK A valid edge occurs on the POSEDGE (fast CLK) before 1$^{st}$ NEGEDGE (fast CLK) after NEGEDGE (slow Logic CLK) The valid edges are denoted by asterixes in FIG. 13.

State Machine Design for More than Two Blocks

Figure 14:
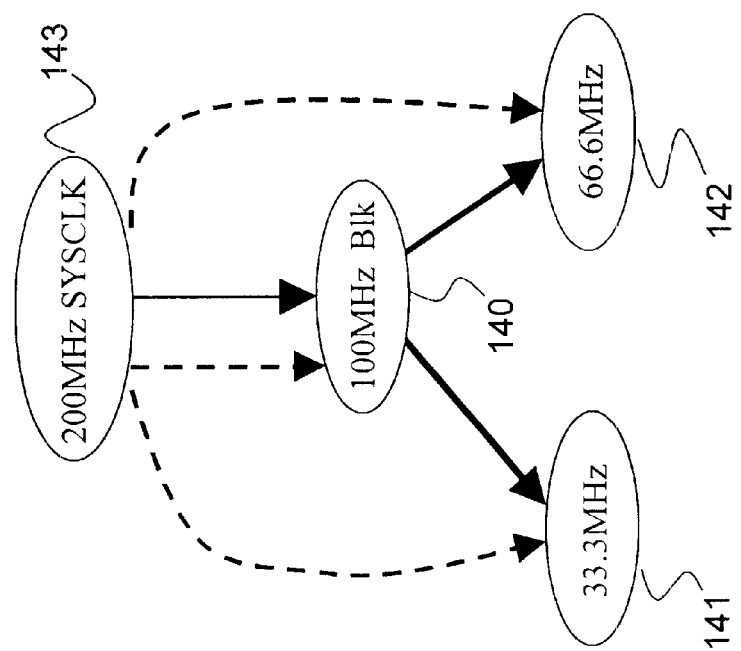

FIG. 14 illustrates a situation whereby an block 140 must communicate with two (or more) slower blocks. shown as cores 141 and 142 In this situation. the state machines have sufficient states to account for the three clocks In FIG. 14 a 200 MHz SYSCLK is divided by divider 143 down to a 100 MHz clock for block 140, which communicates with a 66.6 MHz core and a (50 MHz core. both having clocks derived from SYSCLK The data paths are solid and the clock paths are dashed.

For the CLK generation circuitry for the 100 MHz block, data transfer between the 100 MHz and 66.6 MHz clocks would require a 200 MHz. 6-state. clock generation state machine and data transfer between 100 MHz and 33.3 MHz clocks should also require a 200 MHz, 6-slate clock generation state machine.

Therefore. the state machine needed in order to have periodicity between the block. 140. and the two other blocks, 141 and 142, is a 200 MHz, 6-state, state machine (from the LCM of the three divisors 2, 3, & 6) The period of an odd clock is twice the divisor However this does not affect the LCM calculation in this case. because an even CLK is included.

Figure 15:
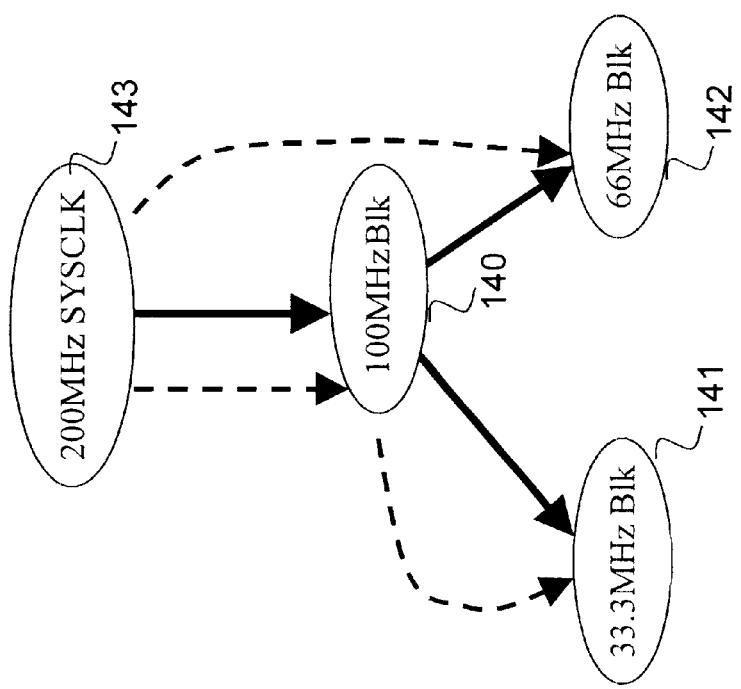
FIGS. 14 and 15 are schematic diagrams illustrating relationships between various parts of a clock system.

FIG. 15 illustrates a situation wherein the blocks use the same speeds as in the previous example but the 33.3 MHz clock for block 141 is derived from the 100 MHz clock in block 140 rather than the 200 MHz SYSCLK This has the advantage of sending a slower signal down to the core, thus reducing poster and routing considerations The 33.3 MHz CLK will now appear to be different from the 33.3 MHz CLK of the previous example This does not (in this example) affect the number of states in the clock generation state machines Data transfer between the 100 MHz and 66.6 MHz clocks will require a 200 MHz, 6-state, clock generation state machine, as before Data transfer between the 100 MHz and 33.3 MHz clocks will require a 200 MHz, 6-state, clock generation state machine.

Therefore. the state machine needed in order to haze periodicity between block 140 and the two other blocks, 141 and 142, is a 200 MHz, 6-state. state machine (from the LCM of the three divisors 2, 3, & 6).

Figure 16:
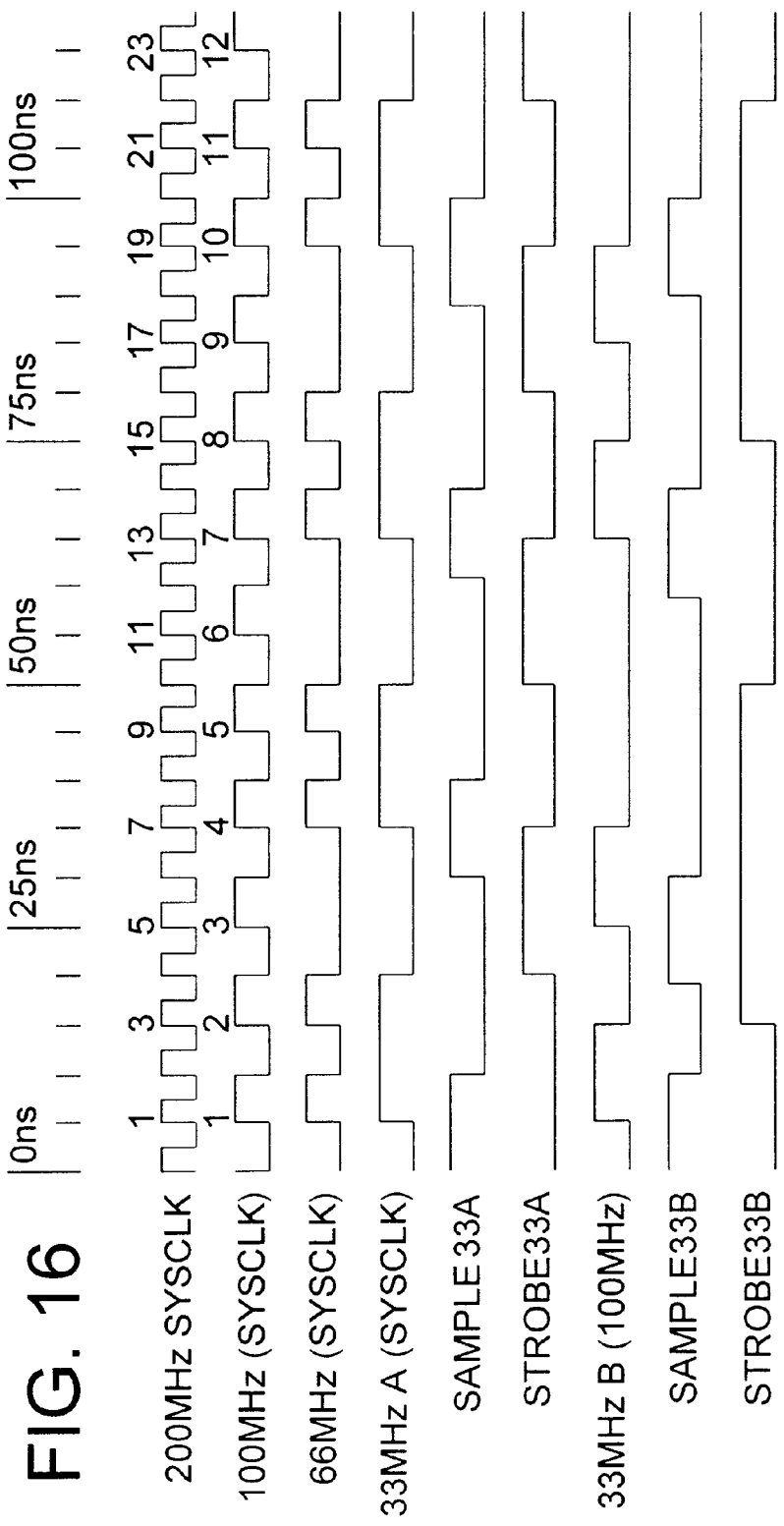
FIG. 16 is a timing diagram

The timing diagram shown in FIG. 16 shows the STROBE and SAMPLE signals for both cases This highlights the differences between the two scenarios Even though the clock frequencies are the same. and each state machine requires the same number of states. the state outputs will be different because of the different divide-by numbers used in the two systems In this diagram, STROBE33A and SAMPLE33A are related to the 33.3 MHz CLK derived from the 200 MHz SYSCLK (ie in the architecture of FIG. 14) and STROBE33B and SAMPLE33B are related to the 33.3 MHz CLK derived from the 100 MHz SYSCLK (ie in the architecture of FIG. 15) Accordingly any state machine must have knowledge of speeds of the block with which they communicate. the speeds of all parent CLKs (including SYSCLK) and the presence of logic CLKs This information is necessary and sufficient for determining the correct version of the state machine.

Figure 17:
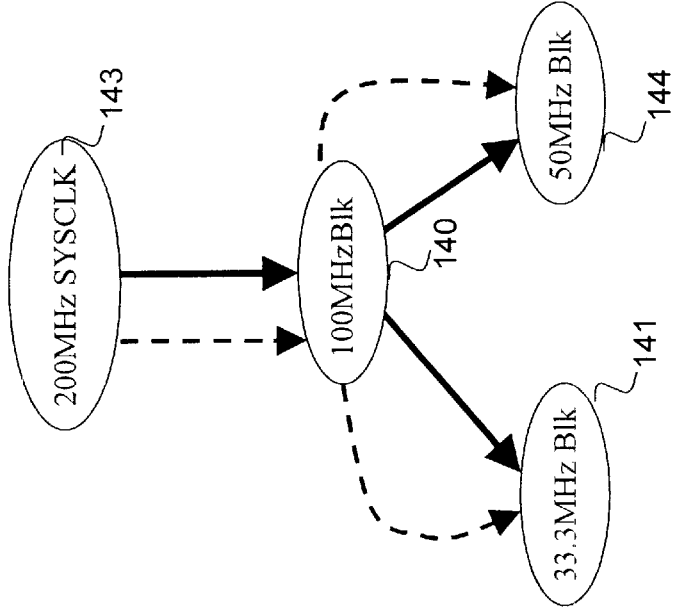
FIG. 17 is a schematic diagram illustrating relationships between various parts of a clock system

FIG. 17 shows the case where the 100 MHz CLK from the block 140 is used as the CLK for the two lower blocks 141 and 144 In this case. the state machine runs off the 100 MHz CLK thus few states are required in the 100 MHz block1 (6 states in this example) Where possible. this scenario is desirable, because it reduces the number of SYSCLK signals around the chip However, this is only allowed if the blocks at the bottom of the diagram do not intercommunicate with blocks on the same level as the 100 MHz, or do not communicate with blocks on a lower level that are derived from anything other than their own local CLKs or the 100 MHz CLK.

Timing Diagram for Full Read Cycle

Figure 18:
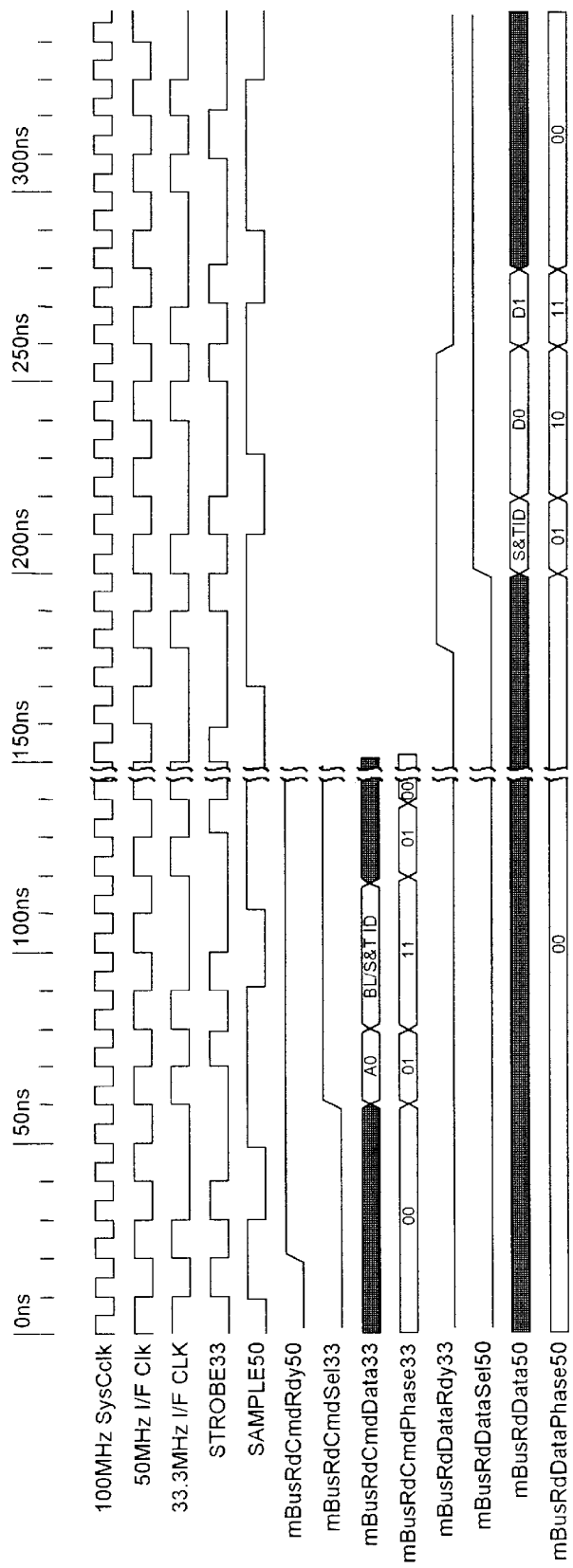
FIGS. 18 and 19 are further timing diagrams.

FIG. 18 illustrates a full read cycle for a system as shown in FIG. 17 All signals indexed '33' are signals initiated b the 33 MHz block and relate to the read request part of the transfer The signals indexed '50' are the read-back data signals from the 50 MHz to the 33 MHz block The only exceptions are the strobe33 and Sample50 signals, which are initiated b the clock generation block.

In this Figure the following abbreviations are used

| | |
|---|---|
| A0: | Address[31:0] |
| BL: | Burst Length |
| TID: | Transaction ID |
| SID: | Source ID |
| 00: | Idle/Null |
| 01: | Incrementing Address (in mBusRdCmd) |
| 10: | SOF (in mBusRdData) |
| 11: | End of Frame |
| D: | Data |

FIG. 18 shows therefore the read cycle for a 33.3 MHz block (141) connected to a 50 MHz block (144) by a 32-bit bus The block is connected to a higher block by a 32-bit bus Memory is connected to the chip via a 32-bit bus The 50 Mhz clock is derived from 100 MHz SYSCLK (divide by 2) and the 33.3 MHz clock is derived from 100 MHz SYSCLK (divide by 3) Included on this diagram (FIG. 18) are all the internal control signals (Strobe, Sample) required to control clocking in/out on selective edges of the 50 MHz clock.

Timing Diagram for Full Write Cycle

Figure 19:
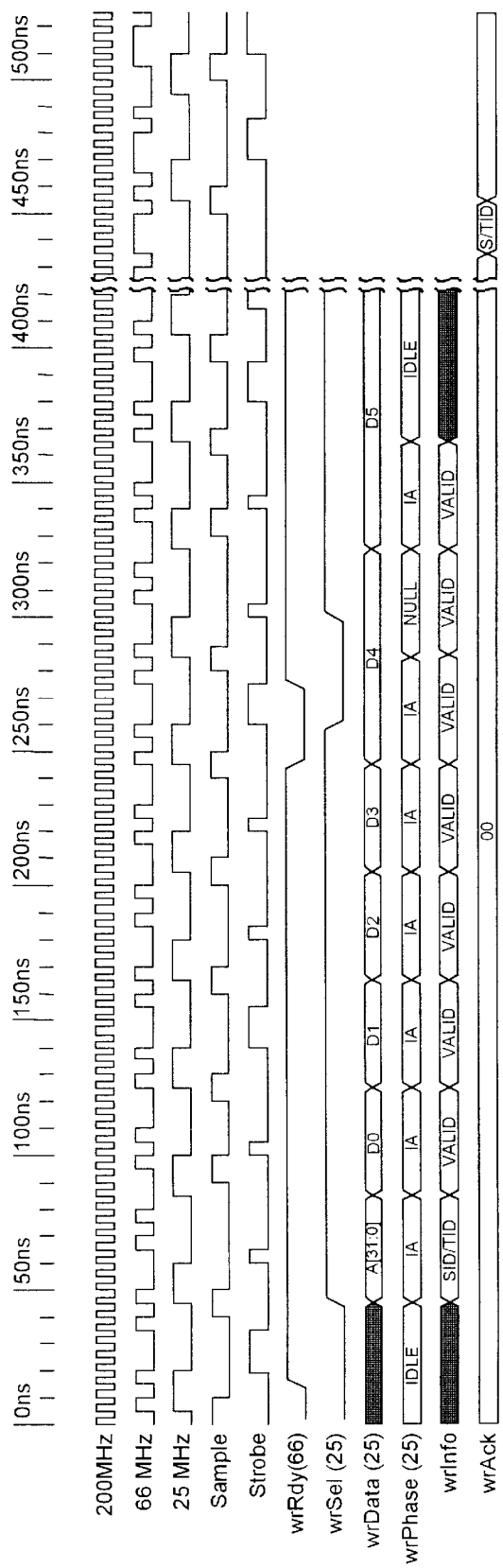

In FIG. 19 the following abbreviations are used

| | |
|---|---|
| A[31:0]: | Address[31:0] |
| BL: | Burst Length |
| TID: | Transaction ID |
| SID: | Source ID |
| 00: | Idle/Null |
| IA: | Incrementing Address |
| EOF: | End of Frame |

FIG. 19 is a write cycle for a 25 MHz block connected to a 66 MHz block by a 32-bit bus The 66 MHz block is connected to a higher block by a 32-bit bus Memory is connected to the chip via a 32-bit bus The 25 MHz clock is derived from 200 MHz SYSCLK (divide by 8) and the 66 MHz clock is derived from 200 MHz SYSCLK (divide by 3).

Power-Up, Reset and Cascaded Sync

As previously mentioned a Cascaded SYNC signal is preferably used to ensure that all blocks remain in sync with any other block that they communicate with This Sync signal can be generated at power-up, reset. and periodically while the chip is running This will ensure that all blocks will start in sync. and continue to run in sync A block running at a particular frequency need only be synchronous with the blocks with whom it communicates directly.

Each CLK generation block (made up of a clock-generating state-machine) expects to see this SYNC signal when in a pre-determined state If the state-machine is not in this state upon receipt of the SYNC, a 'sticky ERR' flag is set. and the state-machine jumps to the correct state This flag will only be cleared by a processor read.

The time of arrival of the SYNC signal in any particular block is a function of the route chosen for the SYNC signal by the system designer The SYNC signal will begin at the SYSCLK level and cascade down the chip to the slowest block on the chip Each block will need to know how long to keep the signal high in order to be seen by the lower block This should not be a problem, however, as knowledge of the lower CLK's behaviour is already present in the state machine for data transfer in these two blocks.

Figure 20:
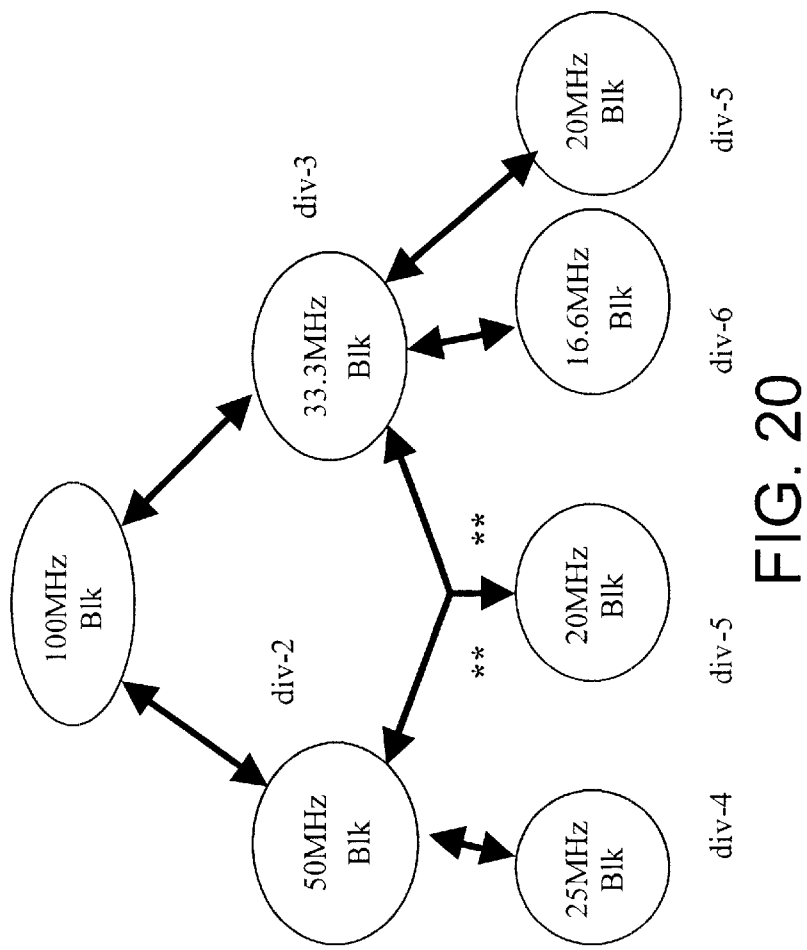
FIG. 20 is a diagram illustrating various blocks of the integrated circuit.

A potential problem occurs where a block communicates with two or more blocks from which it could receive the SYNC signal One example is shown in FIG. 20 which shows a 100 MHz block 201 a 50 MHz block 202, a 33 MHz block 203 and blocks 204–207 at a variety of frequencies In this situation there are two possible sync signals (denoted by double asterixes) which could be sent to block 205 This would obviously not be a satisfactory scenario In this case, the system designer will have to choose which SYNC signal should be routed Therefore, the system designer has an important role to play in the creation of a cascading SYNC signal.

Figure 21:
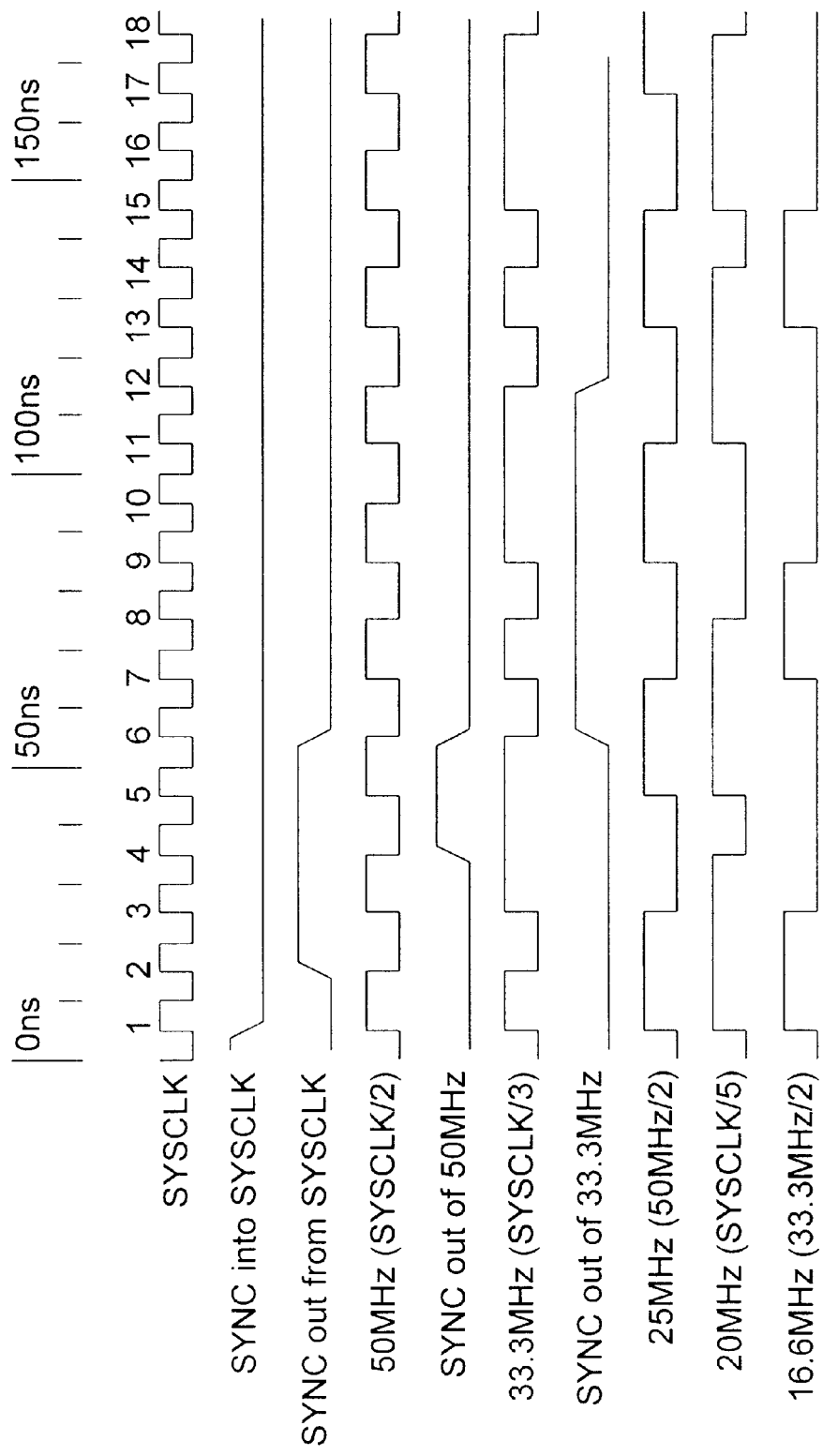
FIG. 21 is a timing diagram.

FIG. 21 shows the timing diagram for the sample architecture shown in FIG. 20 The full cycle would repeat itself after 60 ticks of SYSCLK (ie LCM of the CLK divisors 2,3,4,5,6 (in SYSCLK ticks).

Figure 22:
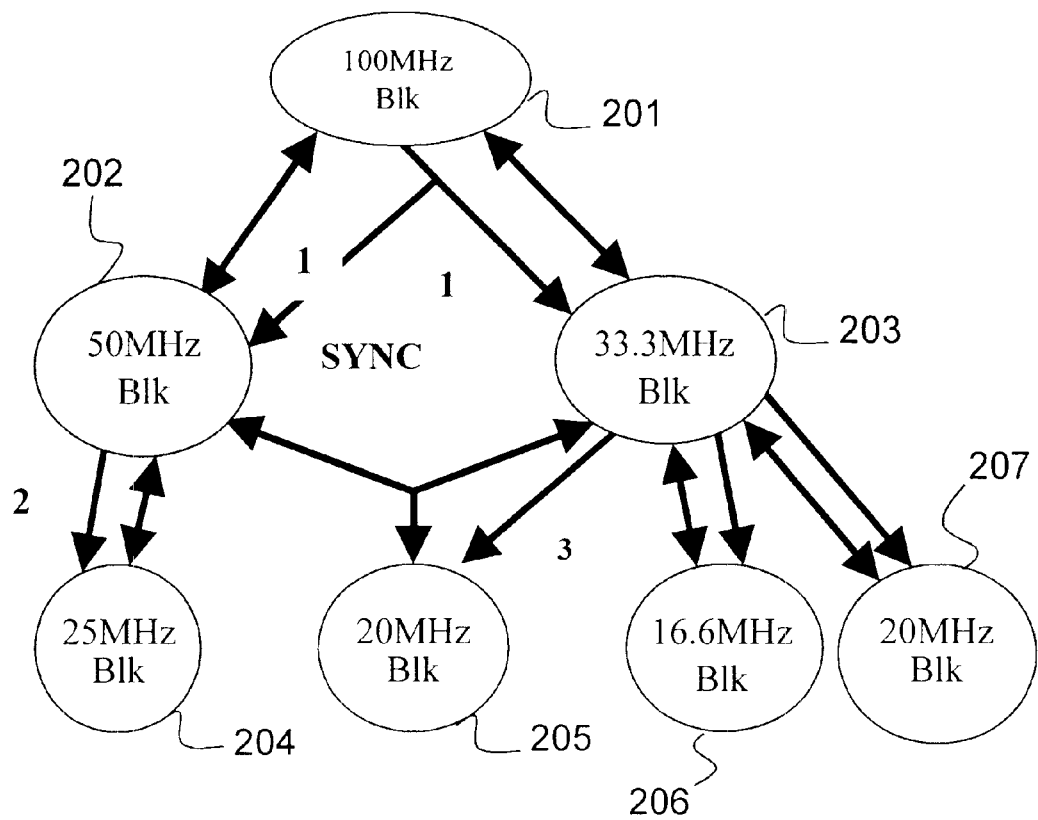
FIG. 22 is a diagram illustrating sychronisation of the various blocks shown in FIG. 20

The SYNC signal for this system would take the following route shown in FIG. 22 It starts from block 201 and cascades via block 202 to block 204 It also cascades via block 203 to blocks 205 to 207.

Figure 23:
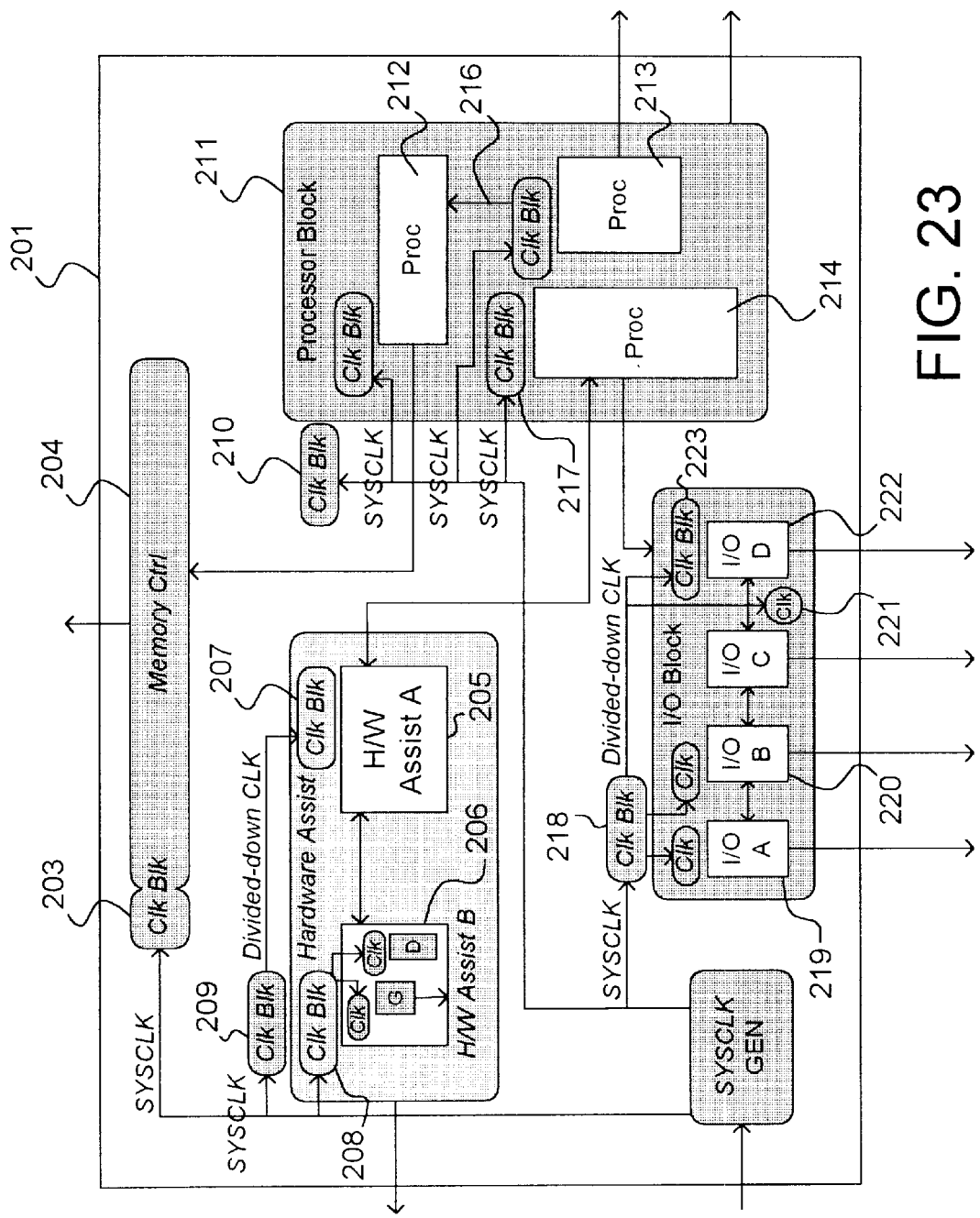
FIG. 23 is a diagram of a system on a chip, with multiple block using different clocks

FIG. 23 illustrates in simplified form a 'system on a chip' ie an integrated circuit 200 realised in an suitable technical manner on a silicon chip 201 The integrated circuit includes a SYSCLK generator 202 which provides the system clock signal (at for example 200 MHz) on the output lines designated SYSCLK Each of these lines is connected to a block designated CLKBLK which provides the relevant derived clocks for an associated operational block These derived clocks may include both the interface clocks and logic clocks according to the particular requirements of the operational block.

Thus CLKBLK 203 provides derived clocks for a memory control block 204 which controls the flow of data to and from an external memory (not shown). Two operational blocks 205 and 206. which provide hardware assist functions have associated CLKBLKs 207 and 208 CLKBLK 207 receives a divided down CLK from a CLKBLK 209 which receives the SYSCLK and provides a SYSCLK/N clock (N being an integer) to CLKBLK 207 CLKBLK 208 receives SYSCLK and provides respective derived clocks to sub-blocks C and D).

SYSCLK is also received by CLKBLK 210 which provides clock signals for a processor block 211 Within this block are individual processors 212, 213 and 214 for which the clock signals are derived by CLKBLKs 215, 216 and 217 respectively.

SYSCLK is also received b a CLKBLK 218 which derives clocks for input/output (I/O) blocks 219 and 220 which could be MAC blocks CLKBLK 218 provides a divided-down clock directly to an I/O block 221 and also to a clock block 223 which provides derived clocks (e g a child clock) to a fourth I/O block 222 This I/O block may for example operate at a different speed to the other I/O blocks.

The clock generation and data clocking rules follow the extensive explanations previously given.

What is claimed is:

1. An integrated circuit which includes:
   a multiplicity of operational blocks having different clock frequencies, each of said blocks having input clock controlled latches for clocking data into the respective block and output clock controlled latches for clocking data out of the respective block;
   wherein at least some of said operational blocks are connected by way of respective ones of said clock controlled latches to other blocks, the thus connected blocks having different operating frequencies; and
   a clock generating system which provides a system clock and further clocks which are integral sub-multiples of the system clock, said further clocks including interface clocks at various different frequencies for use in clocking said data into and out of said operational blocks;
   wherein said system clock has alternate positive and negative edges between binary values, odd-numbered positive edges alternating with even-numbered positive edges and each of the further clocks has positive edges each corresponding to an odd-numbered positive edge of the system clock and negative edges each corresponding to an even-numbered positive edge of the system clock.

2. An integrated circuit as in claim 1 wherein:
   the clock generating system provides at least one derived interface clock which is an integral sub-multiple of one of the further clocks, and
   said derived interface clock has positive edges each corresponding to an odd-numbered positive edge of said one of the further clocks and negative edges of said one of the further clocks.

3. An integrated circuit which includes
a multiplicity of operational blocks having different clock frequencies, each of said blocks having clock controlled latches for clocking data into the respective block and output clock controlled latches for clocking data out of the respective block;
wherein at least some of said operational blocks are connected by way of respective ones of said clock controlled latches to other blocks, the thus connected blocks having different operating frequencies;
a clock generating system which provides a system clock and further clocks which are integral sub-multiples of the system clock, said further clocks including interface clocks at various different frequencies for use in clocking said data into and out of said operational blocks;
wherein said system clock has alternate positive and negative edges between binary values, odd-numbered positive edges alternating with even-numbered positive edges and each of the further clocks has positive edges each corresponding to an odd-numbered positive edge of the system clock and negative edges each corresponding to an even-numbered positive edge of the system clock; and
at least one logic clock for controlling logic within at least one operational block having positive edges which are evenly spaced and which correspond to odd-numbered positive edges of a parent clock and falling edges which correspond to even-numbered rising edges of a parent clock, said parent clock being selected from said system clock and the further clocks.

4. An integrated circuit which includes:
a multiplicity of operational blocks having different clock frequencies, each of said blocks having clock controlled latches for clocking data into the respective block and for clocking data out of the respective block;
wherein at least some of said operational blocks are connected by way of respective ones of said clock controlled latches to other blocks, the thus connected blocks having different operating frequencies; and
a clock generating system which provides a system clock and further clocks which are integral sub-multiples of the system clock, said further clocks including interface clocks at various different frequencies for use in clocking said data into and out of said operational blocks;
wherein said system clock has alternate positive and negative edges between binary values, odd-numbered positive edges alternating with even-numbered positive edges and each of the further clocks has positive edges each corresponding to an odd-numbered positive edge of the system clock and negative edges each corresponding to an even-numbered positive edge of the system clock;
wherein at least two operational blocks are connected for the transfer of data and are controlled by a respective further clock at a higher frequency and a lower frequency respectively; and
wherein the higher frequency block includes a state machine coupled to said clock controlled latches for controlling said transfer of data, said state machine being controlled by the respective further clock at the higher frequency and having a multiplicity of states at least equal to the lowest common multiple of the said higher and said lower frequency clocks.

5. An integrated circuit which includes:
a multiplicity of operational blocks having different clock frequencies, each of said blocks having input clock controlled latches for clocking data into the respective block and output clock controlled latches for clocking data out of the respective block;
wherein the output clock controlled latches of at least some of said operational blocks are connected to input clock controlled latches of at least one other operational block, the thus connected blocks having different operating frequencies; and
a clock generating system which provides a system clock and further clocks which are integral sub-multiples of the system clock, said further clocks including interface clocks at various different frequencies for use in clocking said data into and out of said operational blocks;
wherein said system clock has alternate positive and negative edges between binary values, odd-numbered positive edges alternating with even-numbered positive edges and each of the further clocks has positive edges each corresponding to an odd-numbered positive edge of the system clock and negative edges each corresponding to an even-numbered positive edge of the system clock;
and further comprising, for each of said multiplicity of operational blocks;
means for applying a respective interface clock to respective latches to clock data into and out of the block such that data is clocked into the block on a negative edge of said respective interface clock and data is clocked out of the block on a positive edge of said respective interface clock.

6. An integrated circuit which includes:
a multiplicity of operational blocks having different clock frequencies, each of said blocks having clock controlled latches for clocking data into the respective block and for clocking data out of the respective block;
wherein at least some of said operational blocks are connected to other blocks, the thus connected blocks having different operating frequencies; and
a clock generating system which provides a system clock and further clocks which are integral sub-multiples of the system clock, said further clocks including interface clocks at various different frequencies for use in clocking said data into and out of said operational blocks;
wherein said system clock has alternate positive and negative edges between binary values, odd-numbered positive edges alternating with even-numbered positive edges and each of the further clocks has positive edges each corresponding to an odd-numbered positive edge of the system clock and negative edges each corresponding to an even-numbered positive edge of the system clock; and
wherein at least two of said operational blocks are connected for the transfer of data and are controlled by a respective further clock of a higher frequency and a lower frequency respectively and wherein the block having the higher frequency clock includes a state machine operating at said higher frequency and coupled to said clock controlled latches controlling said transfer of data, said state machine having a multiplicity of states at least equal to the lowest common multiple of the said higher frequency and said lower frequency.

7. An integrated circuit as in claim 6 wherein the clock generating system provides at least one derived interface clock which is an integral sub-multiple of one of the further clocks, wherein said derived interface clock has positive edges each corresponding to an odd-numbered positive edge of said one of the further clocks and negative edges of said one of the further clocks.

8. An integrated circuit as in claim 6 and further comprising at least one logic clock for controlling logic within at least one operational block, having positive edges which are evenly spaced and which correspond to odd-numbered positive edges of a parent clock and falling edges which correspond to even-numbered rising edges of a parent clock, said parent clock being selected from said system clock and the further clocks.

9. An integrated circuit which includes:
a multiplicity of operational blocks having different clock frequencies, each of said blocks having clock controlled latches for clocking data into the respective block and for clocking data out of the respective block;
wherein at least some of said operational blocks are connected by way of respective ones of said clock controlled latches to other blocks;
a clock generating system which provides a system clock and further clocks which are integral sub-multiples of the system clock, said further clocks including interface clocks at various different frequencies for use in clocking said data into and out of said operational blocks; and
wherein said system clock has alternate positive and negative edges between binary values, odd-numbered positive edges alternating with even-numbered positive edges and each of the further clocks has positive edges each corresponding to an odd-numbered positive edge of the system clock and negative edges each corresponding to an even-numbered positive edge of the system clock; and
further comprising means for applying a respective interface clock to respective ones of the clock controlled latches to clock data into and out of the respective operational block such that data is clocked into said respective operational block on a negative edge of said respective interface clock and data is clocked out of said respective operational block on a positive edge of said respective interface clock.

10. An integrated circuit as in claim 9 wherein the clock generating system provides at least one derived interface clock which is an integral sub-multiple of one of the further clocks, wherein said derived interface clock has positive edges each corresponding to an odd-numbered positive edge of said one of the further clocks and negative edges of said one of the further clocks.

11. An integrated circuit as in claim 9 and further comprising at least one logic clock for controlling logic within at least one operational block, having positive edges which are evenly spaced and which correspond to odd-numbered positive edges of a parent clock and falling edges which correspond to even-numbered rising edges of a parent clock, said parent clock being selected from said system clock and the further clocks.

12. An integrated circuit which includes:
a multiplicity of operational blocks having different clock frequencies, each of said blocks having clock controlled latches for clocking data into the respective block and for clocking data out of the respective block;
wherein at least some of said operational blocks are connected by way of (respective ones of said clock controlled latches to other blocks;
a clock generating system which provides a system clock and further clocks which are integral sub-multiples of the system clock, said further clocks including interface clocks at various different frequencies for use in clocking said data into and out of said operational blocks;
wherein said system clock has alternate positive and negative edges between binary values, odd-numbered positive edges alternating with even-numbered positive edges and each of the further clocks has positive edges each corresponding to an odd-numbered positive edge of the system clock and negative edges each corresponding to an even-numbered positive edge of the system clock; and
further comprising means for applying a respective interface clock to respective ones of the clock controlled latches to clock data into and out of the respective operational block such that data is clocked into said respective operational block on a negative edge of said respective interface clock and data is clocked out of said respective operational block on a positive edge of said respective interface clock;
wherein at least two of said operational blocks are connected for the transfer of data and are controlled by clocks of a higher frequency and a lower frequency respectively and wherein the higher frequency block includes a state machine operating at said higher frequency and controlling said transfer of data, said state machine having a multiplicity of states at least equal to the lowest common multiple of the said higher frequency and said lower frequency.

13. An integrated circuit as in claim 12 wherein the clock generating system provides at least one derived interface clock which is an integral sub-multiple of one of the further clocks, wherein said derived interface clock has positive edges each corresponding to an odd-numbered positive edge of said one of the further clocks and negative edges of said one of the further clocks.

14. An integrated circuit as in claim 12 and further comprising at least one logic clock for controlling logic within at least one operational block, having positive edges which are evenly spaced and which correspond to odd-numbered positive edges of a parent clock and falling edges which correspond to even-numbered rising edges of a parent clock, said parent clock being selected from said system clock and the further clocks.

15. An integrated circuit which includes:
a multiplicity of operational blocks having different clock frequencies, each of said blocks having clock controlled latches for clocking data into the respective block and for clocking data out of the respective block;
wherein at least some of said operational blocks are connected to other blocks, the thus connected blocks having different operating frequencies; and
a clock generating system which provides a system clock and a multiplicity of further clocks which are integral sub-multiples of the system clock, said further clocks including interface clocks at various different frequencies for controlling respective ones of said latches;
wherein said system clock has alternate positive and negative edges between binary values, odd-numbered positive edges alternating with even-numbered positive edges and each of said further clocks has positive edges each corresponding to an odd-numbered positive edge of the system clock and negative edges each corresponding to an even-numbered positive edge of the system clock.

* * * * *